United States Patent
Hentschke (10) Patent No.: US 12,435,760 B2
(45) Date of Patent: Oct. 7, 2025

(54) BEARING BODY FOR A SLIDING BEARING AND METHOD FOR PRODUCING A BEARING BODY

(71) Applicant: Schaeffler Technologies AG & Co. KG, Herzogenaurach (DE)

(72) Inventor: Christoph Hentschke, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 157 days.

(21) Appl. No.: 18/261,770

(22) PCT Filed: Oct. 22, 2021

(86) PCT No.: PCT/DE2021/100850
§ 371 (c)(1),
(2) Date: Jul. 17, 2023

(87) PCT Pub. No.: WO2022/156838
PCT Pub. Date: Jul. 28, 2022

(65) Prior Publication Data
US 2024/0125355 A1     Apr. 18, 2024

(30) Foreign Application Priority Data
Jan. 20, 2021   (DE) .......................... 102021101097.7

(51) Int. Cl.
*F16C 33/20*     (2006.01)

(52) U.S. Cl.
CPC .......... *F16C 33/208* (2013.01); *F16C 33/203* (2013.01); *F16C 2220/60* (2013.01); *F16C 2223/30* (2013.01); *F16C 2360/31* (2013.01)

(58) Field of Classification Search
CPC .. F16C 33/208; F16C 33/203; F16C 2220/60; F16C 2223/30; F16C 2360/31; F16C 17/02; F16C 17/04; F16C 17/10
See application file for complete search history.

(56) References Cited

U.S. PATENT DOCUMENTS

| | | | |
|---|---|---|---|
| 6,149,160 A * | 11/2000 | Stephens | F16J 15/3424 277/408 |
| 6,280,090 B1 | 8/2001 | Stephens et al. | |
| 6,498,127 B1 | 12/2002 | Niwa et al. | |
| 11,092,191 B2 * | 8/2021 | Hentschke | F16C 33/208 |
| 2017/0314618 A1 * | 11/2017 | Speckert | B32B 15/01 |

FOREIGN PATENT DOCUMENTS

| | | |
|---|---|---|
| DE | 133883 | 9/1901 |
| DE | 102007023418 A1 | 11/2008 |
| DE | 102009002529 A1 | 10/2010 |
| DE | 102012014114 A1 | 1/2014 |

(Continued)

*Primary Examiner* — John Olszewski
*Assistant Examiner* — Aimee Tran Nguyen
(74) *Attorney, Agent, or Firm* — Price Heneveld LLP (57) ABSTRACT

A metallic bearing body for a sliding bearing includes a main body and a plurality of protrusions extending outward from the main body. Each of the plurality of protrusions extends in a longitudinal direction from the main body to an upper surface that is distal from the main body and has at least one through-bore that extends through the protrusion transversely relative to the longitudinal direction.

15 Claims, 8 Drawing Sheets

(56) References Cited

FOREIGN PATENT DOCUMENTS

| | | |
|---|---|---|
| DE | 102016110858 A1 | 12/2017 |
| DE | 102017119728 A1 | 2/2019 |
| DE | 102019101969 A1 | 7/2020 |
| EP | 1854903 A1 | 11/2007 |
| JP | 2015016596 A | 1/2015 |
| RU | 112303 U1 | 1/2012 |

* cited by examiner

BEARING BODY FOR A SLIDING BEARING AND METHOD FOR PRODUCING A BEARING BODY

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/2021/100850, filed on Oct. 22, 2021, designating the United States of America, which in turn claims the benefit of priority under 35 U.S.C. §§ 119, 365 of German Patent Application No. 102021101097.7, filed Jan. 20, 2021, the contents of which are relied upon and incorporated herein by reference in their entirety.

FIELD OF THE DISCLOSURE

The disclosure relates to a method for producing a bearing body for a sliding bearing. Furthermore, the disclosure relates to a metallic bearing body intended for use in a sliding bearing.

BACKGROUND OF THE DISCLOSURE

Microstructured surfaces in mechanical bearings are described, for example, in US 6 280 090 B1. The microstructures specified there can, among other things, be cuboid. They occupy a predetermined proportion of the total surface area and are within specified dimensional ranges. The aim of the structuring is in particular to influence the heat conduction and the lubricating properties of the bearings.

JP 2015-16596 A comprises a composite structure made of plastic and metal and the manufacture thereof. To increase the connection between the two components and to prevent anisotropy in the adhesive strength, recesses are introduced into the metallic composite partner. These are subject to defined specifications with regard to, for example, their entrance angle to the surface, the dimensions thereof and the total volume fraction thereof in relation to the composite surface.

DE 133 883 A shows bearing shells or plates which, to increase the resistance thereof, have a skeleton made of harder materials such as steel or iron and are firmly connected to a soft metal. The skeleton can protrude outwards at the support surfaces and can be reused by melting the soft metal.

A generic method for producing a bearing body of a sliding bearing arrangement is known, for example, from DE 10 2019 101 969 A1. Within the scope of this known method, a plurality of intersecting grooves are first introduced into a surface of a main body from which the bearing body is manufactured, so that rod-like protrusions remain between the grooves. In a further method step described in detail in DE 10 2019 101 969 A1, the protrusions are reshaped in such a way that a pattern of undercut-like geometries is formed. The undercuts are intended to anchor a sliding bearing material, which can be a thermoplastic material, on the main body in a form-fitting manner.

A further method is disclosed in DE 10 2012 014 114 A1 with which an improvement in adhesion between a metallic surface and a layer thermally sprayed or cast thereon is to be achieved. In this case, the surface of a metal workpiece is machined by electrical discharge wire machining, which produces undercuts. Alternatively, broaching can be used as a material-removing treatment. The method according to DE 10 2012 014 114 A1 should be particularly suitable for machining a connecting rod.

DE 10 2009 002 529 A1 describes a method for the machining of components of an injection pump for an internal combustion engine. A rotating part is housed in a sliding bearing of the injection pump, wherein the sliding bearing is provided with a fissure on the surface thereof facing the rotating part, in which is anchored a sliding layer made of PTFE or PEEK touching the rotating part. A laser treatment is proposed to produce the fissures. The fissure can comprise intersecting grooves. Indentations caused by fissuring can have a different depth and/or width in different partial regions of the surface.

A method disclosed in DE 10 2017 119 728 A1 for producing a sliding bearing provides for the application of an intermediate layer of a metallic material to a bearing main body via selective laser melting, wherein the bearing main body itself can also be produced by means of selective laser melting. The intermediate layer can have contours designed as undercuts, which are shaped like a dovetail, for interlocking with a sliding layer made of a non-metallic material. The sliding layer is applied to the intermediate layer by melting or fusing.

DE 10 2016 110 858 A1 describes a sliding bearing which comprises a bearing main body made of a metallic material and an intermediate layer also made of a metallic material, wherein is located a sliding bearing layer made of a non-metallic material, for example PEEK. The intermediate layer is an arrangement of wires or a perforated metal sheet or open-cell metal foam. In the case of an intermediate layer of wires, this can be formed from different materials, for example stainless steel and copper.

A sliding bearing element described in U.S. Pat. No. 6,498,127 B1 comprises a main body made of metal and a porous sintered layer made of a copper alloy located on the surface thereof. The sintered layer is impregnated with a non-metallic sliding bearing material and consists of particles with an average size of 25 µm to 100 µm, wherein the layer thickness of the sintered layer is no more than four times the thickness of one layer of the non-ferrous metal particles. Among other things, polyimide is proposed as a sliding bearing material.

RU 112 303 U1 discloses a sliding bearing made up of an inner ring and an outer ring, for the manufacture of which, among other things, a woven material made of PTFE fibers is used.

SUMMARY OF THE DISCLOSURE

The disclosure is based on the object of further developing the mechanically stressed connection between a metal bearing body and a sliding lining of a sliding bearing compared to the prior art mentioned, wherein a favorable relationship exists between product properties that remain as constant as possible over the long term, even under changing loads, and production costs.

This object is achieved by a method for producing a bearing body as set forth in the present disclosure. The object is also achieved by a metal bearing body intended for use in a sliding bearing and having the features set forth in the present disclosure. The configurations and advantages of the disclosure explained below in connection with the bearing body also apply analogously to the production method, and vice versa.

The method for producing a bearing body for a sliding bearing is based, in a basic concept known per se, on the provision of a metallic main body, the surface of which is machined in such a way that rod-like protrusions, i.e., journals, are formed on the surface. In the present case, the term "journal" is used independently of the length/diameter ratio of the protrusions. In any case, the further machining of the main body produces form-fitting contours of each protrusion, which are suitable for the form-fitting retention of a non-metallic sliding lining. The form-fitting contours are, at least in part, openings or bores that run through the protrusions in the transverse direction thereof.

The terms "through-bore" and "blind hole" are to be understood here in such a way that it is generally a through-opening or blind hole opening that is only preferably formed by drilling. This includes drilling, in particular laser drilling, milling, turning, and bore electrical discharge machining. However, other methods for forming a through-opening or a blind hole opening, such as etching, should also be included here for forming a through-bore or blind hole.

With the through-bores, the main direction of which is aligned to be parallel to the surface of the main body, the effect of a sliding coating firmly woven on the surface can be achieved without it actually being made up of individual fibers intertwined with the main body by weaving.

As far as the protrusion of the rod-like protrusions is concerned, various production methods known per se can be used. In particular, the protrusions can be produced by cutting. This can be done in an efficient manner, for example, by producing intersecting grooves on the surface of the main body. Depending on the material of the main body, processes such as etching, electrical discharge machining, or even laser ablation can also be used. In principle, it is also possible to produce the rod-like protrusions directly within the framework of primary shaping, for example casting, of the main body. In all cases, the rod-like protrusions are arranged in a geometrically defined manner on the surface of the main body. In particular, the protrusions form a uniform geometric pattern on the surface of the main body. Alternatively, a larger number of protrusions can also be provided locally, for example at locations of the bearing body that are subject to greater mechanical stress, to further improve the anchoring of the sliding coating on the main body in this region.

The individual journals have, in particular, a polygonal cross-section, for example a square or hexagonal cross-section. However, round, oval, or triangular cross-sections can also be realized.

The rod-like protrusions or journals each preferably have a minimum dimension of 0.5 mm in the three spatial dimensions. Furthermore, the rod-like protrusions or journals preferably each have a maximum dimension of 5 mm in the three spatial dimensions. A rod-like protrusion or journal (width W×length L×height H) can be dimensioned, for example, W×L×H=1 mm×1 mm×1 mm or 1 mm×2 mm×0.5 mm. The dimensions of the journals in the three spatial directions can be similar or can differ greatly from one another. The geometry of the rod-like protrusions can therefore resemble a cube, for example, or an elongated cuboid, which protrudes from the main body like a web.

In each individual rod-like protrusion, a number of openings can be produced, in particular by laser ablation, which are connected to one another after the machining has been completed. In this case, the machining is carried out from different sides of the rod-like protrusion in such a way that neighboring rod-like protrusions are not affected. This applies to machining or etching in the same way as to laser machining. In the case of laser machining, a laser beam can be directed onto the rod-like protrusion in successive machining steps in such a way that it hits the rod-like protrusion at different angles, in each case based on the longitudinal direction of the rod-like protrusion.

In particular, in one of the machining steps, the laser beam can be aligned in the longitudinal direction of the rod-like protrusion, i.e., in the direction normal to the surface of the bearing body, whereas in another machining step the laser beam is aligned at an angle to the normal direction mentioned, for example inclined at an angle of 45°±15° to the normal direction.

The first-mentioned machining step produces a blind hole, the depth of which does not necessarily correspond exactly to the height of the rod-like protrusion. For example, the blind hole can only extend over part of the length of the rod-like protrusion. Likewise, embodiments can be realized in which the blind hole protrudes somewhat beyond the rod-like protrusion into the main body. Regardless of the length thereof, the central axis of the blind hole can coincide with the central axis of the rod-like protrusion, that is to say, the journal.

Several bores, which are created at an angle oblique to the journal, are introduced according to various possible configurations from diametrically opposite sides of the journal and open into the blind hole, so that they meet in the blind hole and thus a through-bore is produced which is aligned overall in the transverse direction of the journal, but is not straight. If there is only one such through-bore, this describes a W-shape together with the blind hole in the longitudinal section of the journal.

According to a possible further development, the journal is traversed by a plurality of through-bores which run mainly in the transverse direction of the journal and each have a kink, i.e., V-shaped through-bores which meet at an intersection located in the blind hole. In the case of a journal with a rectangular cross-section, there are, for example, two such through-bores, while in the case of a journal with a hexagonal cross-section there are three such through-bores.

A possible variant of the method provides that a plurality of bores penetrating the rod-like protrusion, i.e., journals, are generated by laser radiation being directed exclusively at the upper side of the rod-like protrusion, i.e., at the end face thereof. The upper side of the rod-like protrusion is typically identical to the original workpiece surface from which the journals are machined, in particular by metal removal machining.

Laser beams which strike a journal at the end face, according to this variant of the method, exit again from a side surface of the journal. This means that the laser radiation hits the workpiece, i.e., the bearing body, at an angle to the workpiece surface and hits the main body of the bearing body in the region between the journals, in particular in one of the crossing grooves, without a continuous beam penetrating the main body at this point to create an opening. Several laser-generated through-openings running obliquely through the journal, each ending on the end face of the journal on the one hand and on a side surface of the journal on the other hand, together describe a non-straight through-bore running through the journal in the transverse direction thereof. This applies both to variants in which a central blind hole is produced by laser radiation in addition to the sloping bores, and to variants in which no laser radiation that hits the material surface perpendicularly is used, but all laser beams that structure the journal exclusively directed at an angle to the material surface.

Irrespective of the precise cross-sectional geometry of the journal, the interconnected holes in the journal represent undercuts which anchor in a form-fitting manner a sliding coating to be applied at a later stage of the method.

The sliding coating is a non-metallic sliding coating and is formed in particular from a thermoplastic material or a fiber-reinforced thermoplastic material. In particular, PTFE or PEEK is used as the thermoplastic material in this case. Fibers with a fiber length in the range of 50-100 µm, preferably carbon fibers, are used in particular for fiber reinforcement of the plastic. The thermoplastic can be melted onto the bearing body in a manner known in principle.

A sliding bearing comprising the bearing body and the sliding coating located thereon can be designed, for example, as a large bearing for wind turbines. Depending on the geometry of the bearing body, this is provided, for example, to absorb radial loads or—particularly in the case of an angular sliding bearing—to absorb combined radial and axial loads. In principle, the design of the bearing body as a component of a spherical sliding bearing is also possible.

The advantage of the bearing body of the present disclosure lies in particular in the fact that an intimate connection that can also withstand fluctuating loads can be produced in a reliably reproducible manner, without an intermediate layer, between a metallic main body of a sliding bearing component and a non-metallic sliding lining.

BRIEF DESCRIPTION OF THE DRAWINGS

In the following, several exemplary embodiments of the present disclosure are explained in more detail by means of a drawing. Herein, partly simplified.

Unless otherwise stated, the following explanations relate to all exemplary embodiments. Parts that correspond to each other or have basically the same effect are marked with the same reference symbols in all figures.

DETAILED DESCRIPTION

A bearing body, generally marked with the reference symbol 1, is intended for use in a sliding bearing, not further described. The bearing body 1 is made of a main body 2 made of steel, on the surface of which there are numerous rod-like protrusions 3 arranged in a regular pattern, which are also referred to as journals for short. Each journal 3 has an upper side, denoted by 4, and a plurality of side surfaces 5, and is produced by removing material from the main body 2. This means that a level placed on the upper side 4 of journal 3 indicates the position of the original, unmachined surface of main body 2.

The side surfaces 5 can be produced at least in part in that straight grooves 6 are introduced into the main body 2 by metal removal machining. The groove base is denoted by 9. All journals 3 are shown on a common plane in the schematic FIGS. 1 to 7, the xy-plane; however, in practice, the surface on which the journals 3 are arranged as integral parts of the main body 2 is a curved surface. Accordingly, there are grooves 6, which are designed as annular grooves. Configurations can also be realized in which the grooves 6 are wound in a helical manner, in particular on a cylindrical inner peripheral surface of the main body 2.

In the embodiments according to FIGS. 1 to 6, each journal 3 has a central blind hole 7 which is aligned in the longitudinal direction LR of the journal 3, i.e., in the z-direction. QR is used to designate the transverse direction of the journal 3. The blind holes 7 can be produced by laser machining. Alternatively, the blind holes 7 can be introduced by metal removal. Bores or openings penetrating the main body 2 do not exist.

In addition to the central blind hole 7, each journal 3 may have a plurality of through-bores 8. Each of these through-bores 8, which are also present in the exemplary embodiment according to FIG. 7, is produced in several working steps.

Figure 3:
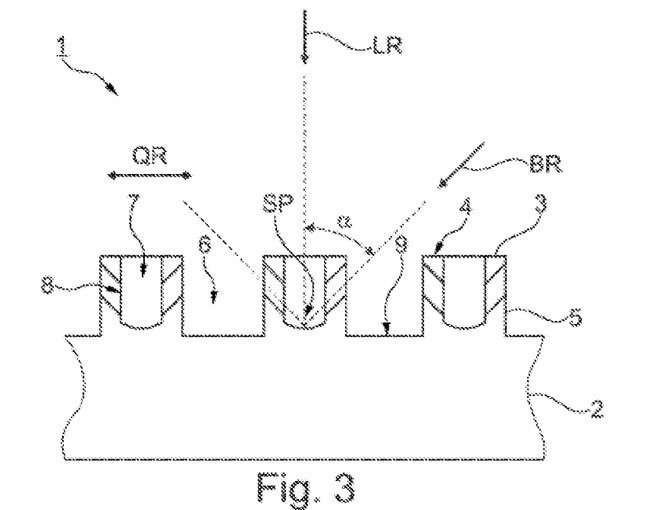
FIG. 3 shows a longitudinal sectional view of the bearing body according to FIG. 1.

As illustrated in FIG. 3, an opening is first produced from one of the side surfaces 5, which ends in the blind hole 7. This process, which in turn can be carried out in the form of laser machining or metal removal machining, alternatively also by electrical discharge machining or etching, takes place in a machining direction BR which encloses an acute angle $\alpha$ of $45°\pm15°$ with the longitudinal direction LR. The angle $\alpha$, matched to the geometry and arrangement of the journals 3, is selected in such a way that adjacent journals 3 are not disruptive or are not machined in an unintended manner.

After the first side surface 5 has been opened in the manner described, a corresponding opening is produced in the diametrically opposite side surface 5, so that overall the through-bore 8, the main direction of which corresponds to the transverse direction QR, is produced. The through-bore 8 has a V shape in longitudinal section. Several through-bores 8 produced in the same way meet at an intersection SP, which lies on the central axis of the blind hole 7 and thus of the entire journal 3.

Figure 1:
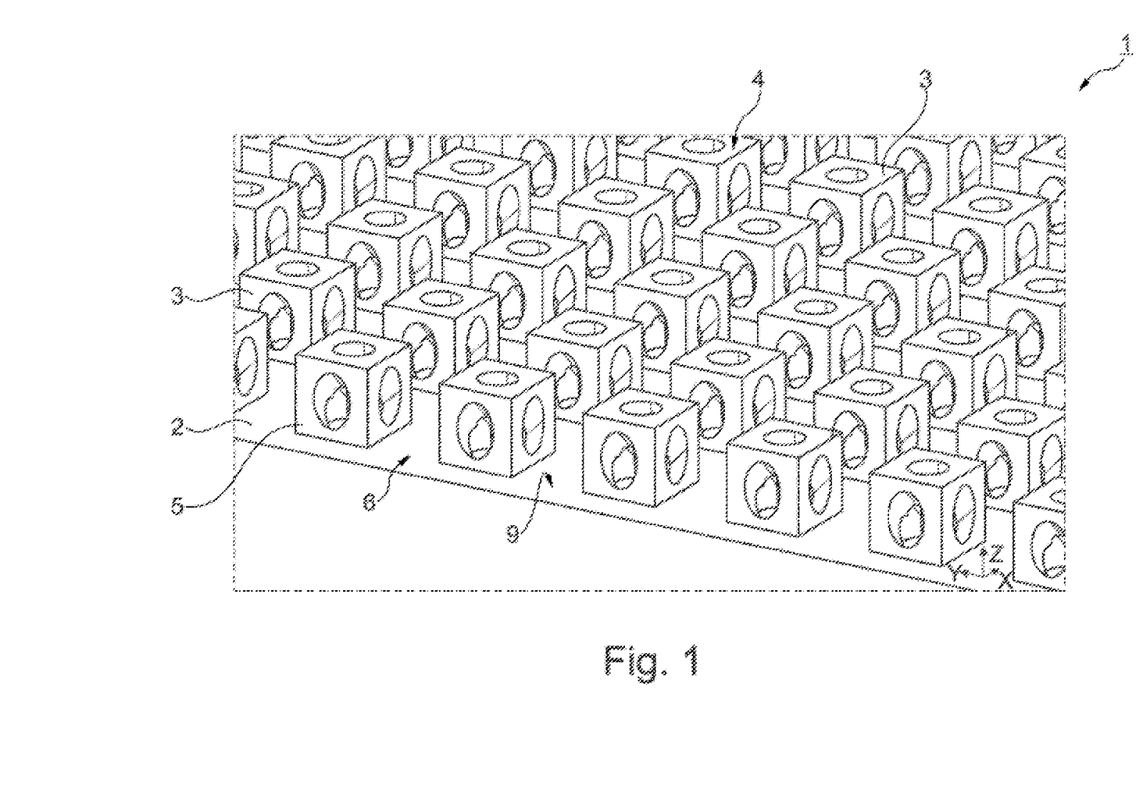
FIG. 1 shows a section of a bearing body for a sliding bearing in a perspective view.
Figure 2:
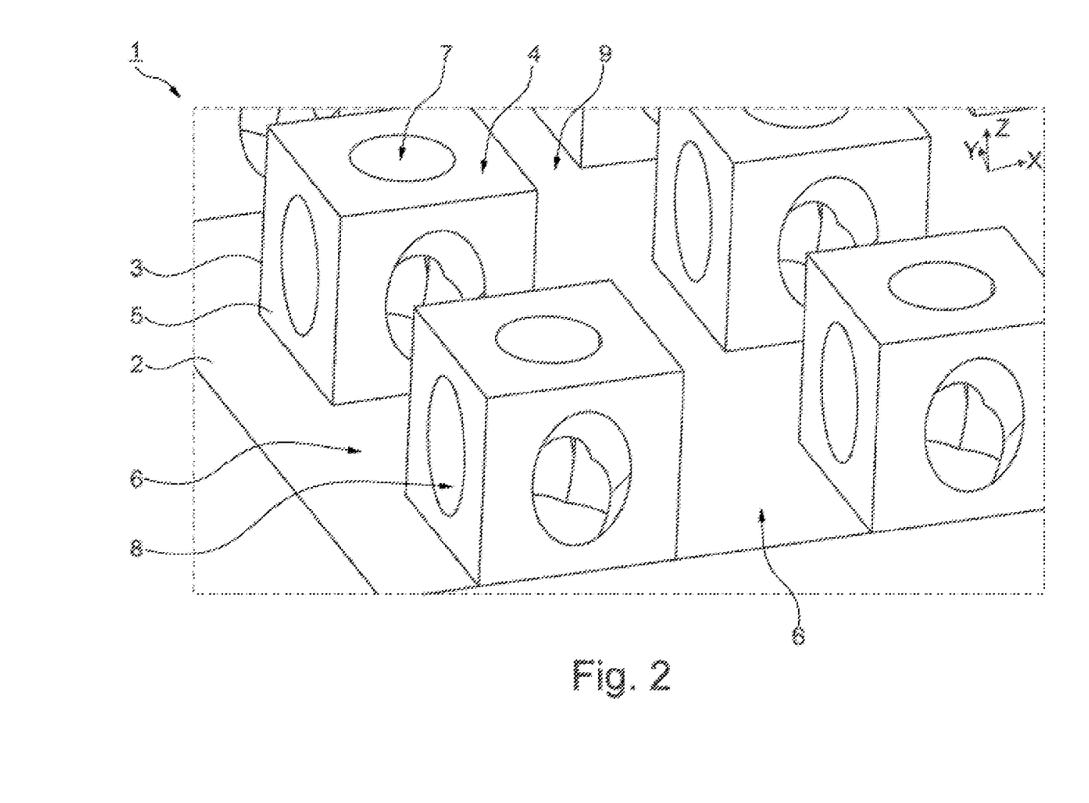
FIG. 2 shows a detail of the arrangement according to FIG. 1.
Figure 4:
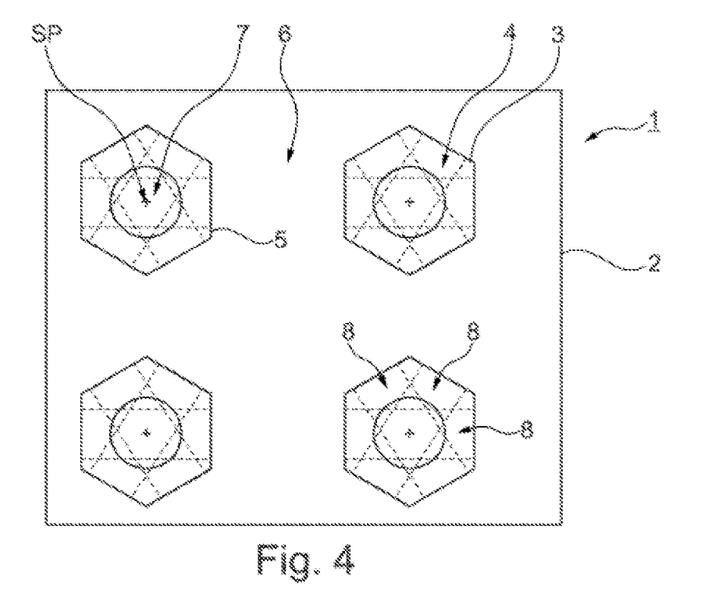
FIG. 4 shows an alternative design of a bearing body for a sliding bearing in a schematic plan view.
Figure 5:
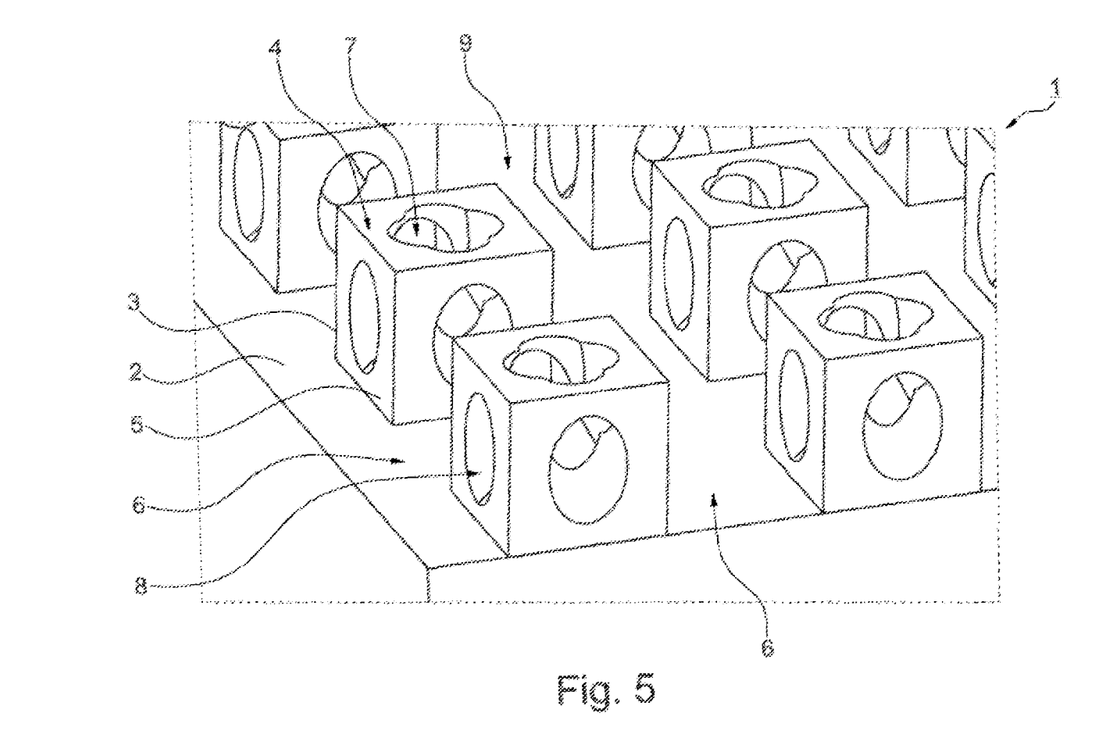
FIG. 5 shows a further design option for a bearing body for a sliding bearing in a representation analogous to FIG. 2.
Figure 6:
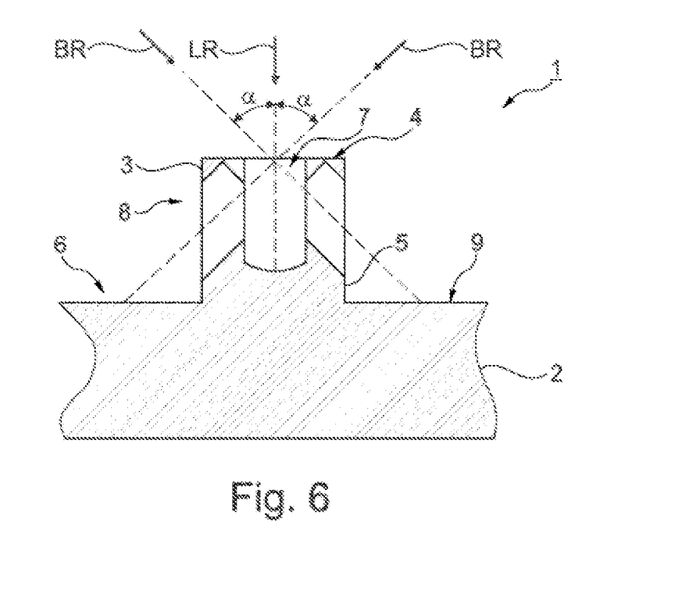
FIG. 6 shows a schematic sectional representation of the bearing body according to FIG. 5 in a representation similar to FIG. 3.
Figure 7:
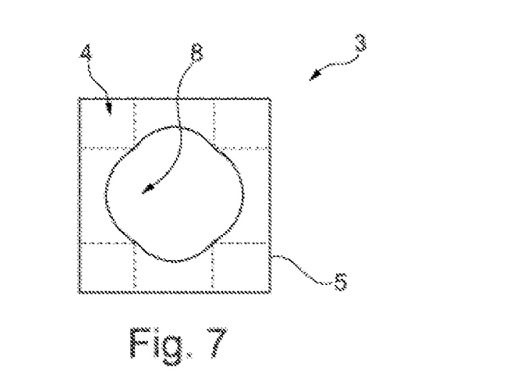
FIG. 7 shows a schematic plan view of a journal of a further bearing body for a sliding bearing.

In the exemplary embodiment according to FIGS. 1 to 3, as in the exemplary embodiments according to FIGS. 5 to 7, each journal 3 has the basic shape of a cube. Accordingly, each journal 3 is traversed by two through-bores 8 which intersect at right angles when viewed from above. Deviating therefrom, the bearing body 1 according to FIG. 4 has journals 3 with a hexagonal cross-section, which are each traversed by three through-bores 8.

By laser radiation, which radiates laterally onto the journals 3 and generates in several steps the through-bores 8, the journals 3 of the bearing body 1 according to FIG. 4 are also machinable. Deviating from this machining mode, the laser radiation with which the journals 3 of the bearing bodies 1 are machined according to FIGS. 5 to 7 is directed exclusively at the upper side 4, i.e., the end face of the journal 3.

In these cases, too, the angle α is selected in such a way that adjacent journals 3 are not affected during the laser machining.

In addition to a through-bore 8 running in the transverse direction QR and produced by multi-stage machining, a central blind hole 7 can be seen in FIG. 6. Such a central blind hole 7, running in the normal direction to the upper side 4, is not present in the embodiment according to FIG. 7. Rather, in this case, only laser radiation is used for laser machining, which is aligned obliquely to the substrate surface, i.e., to the upper side 4. The non-circular cross-sectional shape of the through-bore 8 in the plane defined by the upper side 4 can be seen in both FIG. 5 and FIG. 7. This cross-sectional shape with four arcs combined to form a closed contour results from the fourfold laser irradiation of the end face of the journal 3.

Figure 8:
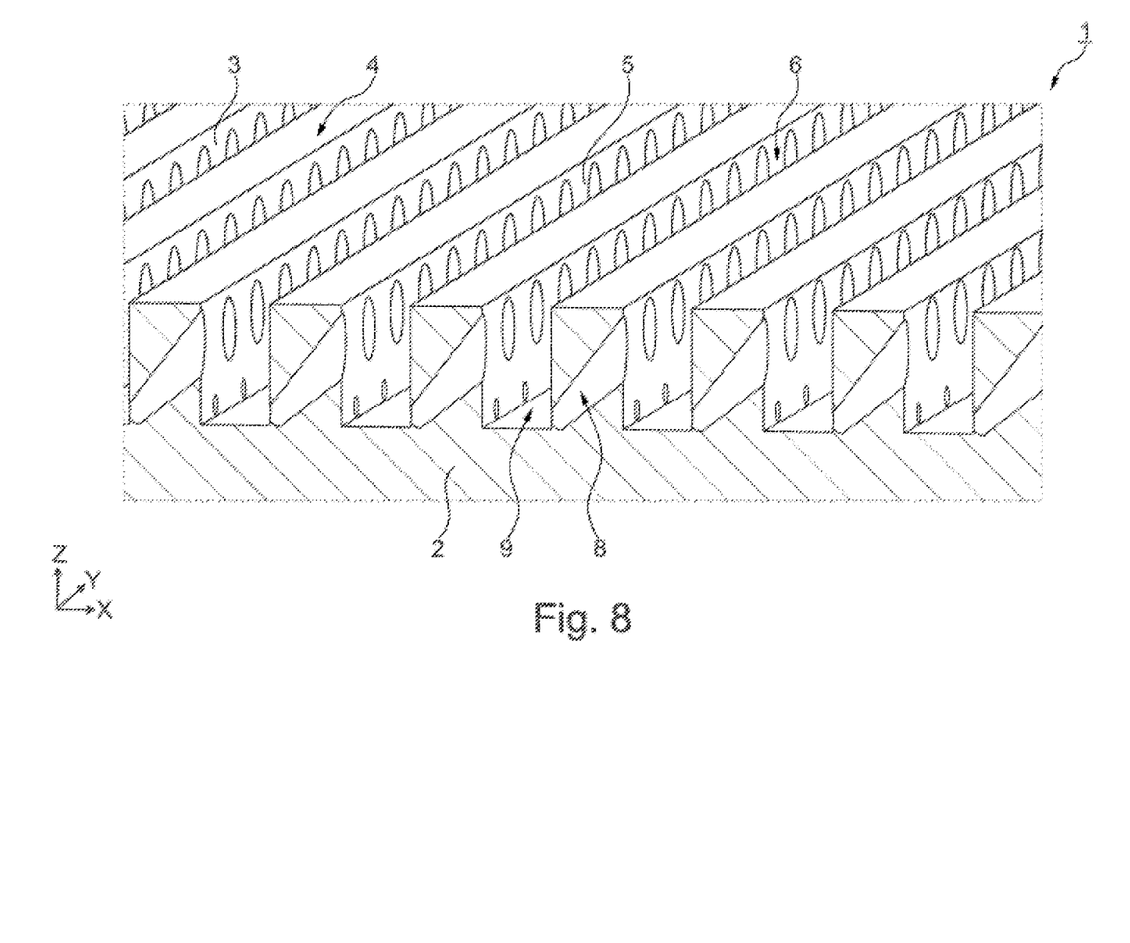
FIG. 8 shows a detail of an alternative design of a bearing body for a sliding bearing in cross-section in a perspective view.

A further embodiment of a bearing body 1 machined using the method described is shown in FIG. 8. Contrary to the embodiment variants shown in FIG. 1 to FIG. 7, FIG. 8 does not involve journals 3 formed in sections in the x- and y-direction. Rather, the rod-like protrusions 3 are formed in sections in the x-direction and continuously in the y-direction. In the x-direction, they are spaced apart from one another by a groove 6 with a groove base 9 running in the y-direction. In the same way, the rod-like protrusions 3 can be formed continuously in the x-direction and in sections in the y-direction and can each be spaced apart in the y-direction by a groove 6 running in the x-direction with a groove base 9. Similar to FIG. 7, the rod-like protrusions 3 which protrude from the main body 2 in the z-direction have no recognizable recess on the upper side 4 thereof. Only through-bores 8 running obliquely to the upper side 4 pass through the rod-like protrusions 3 in such a way that they enter a side surface 5 and exit on a side surface 5 lying opposite thereto in the x-direction. This is shown alternately in FIG. 8, i.e., the through-bores 8 occur on both sides of the rod-like protrusions 3 in the x-direction, wherein the outlet opening and inlet opening alternate on a side surface 5 along the y-direction. The inlet opening is close to the upper side 4 in the z-direction, and the outlet opening is close to the main body in the z-direction. The inlet opening has a smaller diameter than the outlet opening.

Figure 9:
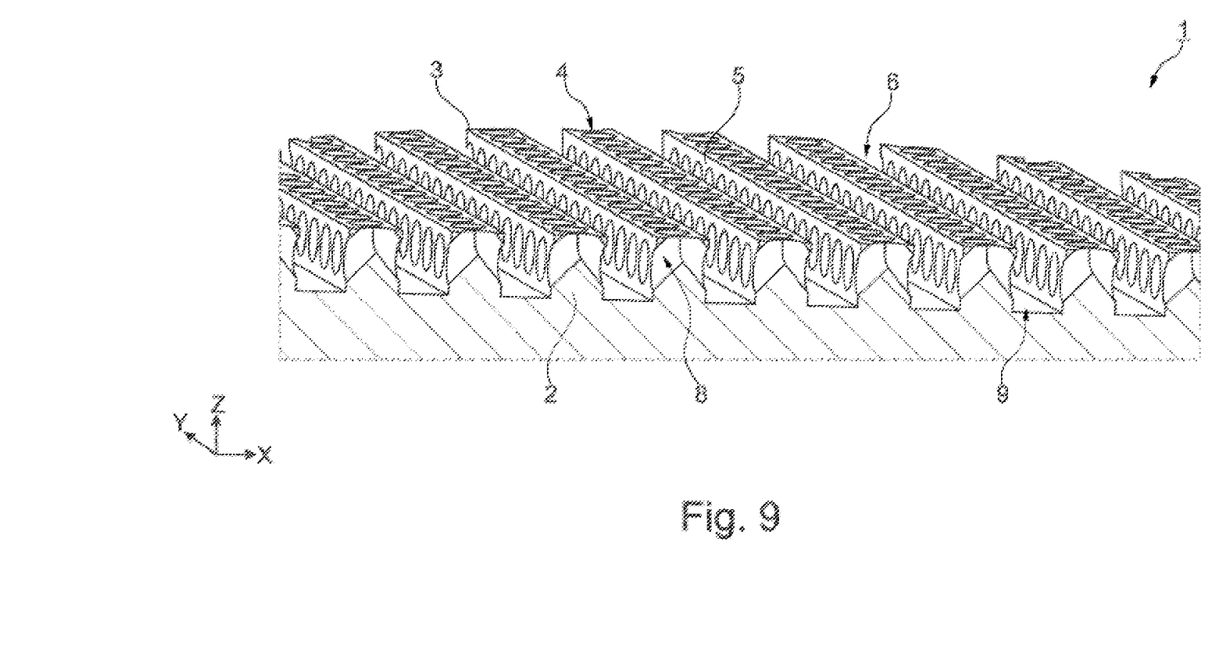
FIG. 9 shows a detail of a further embodiment of a bearing body for a sliding bearing in cross-section in a perspective view.

The variant shown in FIG. 9 is also an embodiment of the rod-like protrusions 3 in sections in the x-direction and continuous in the y-direction. They protrude from the main body 2 in the z-direction, have an upper side 4 and side surfaces 5 and are spaced apart by a groove 6 running in the y-direction with a groove base 9. In the same way, the rod-like protrusions 3 can be formed continuously in the x-direction and in sections in the y-direction and can each be spaced apart in the y-direction by a groove 6 running in the x-direction with a groove base 9. The machining of the rod-like protrusions 3 takes place in a manner similar to that shown in FIGS. 5 to 7, starting from the upper side 4, that is to say the end face of the journal. The bore opens the upper side 4 of the rod-like protrusions 3 on entry and opens a side surface 5 on exit. The inlet opening and the outlet opening are at least approximately circular and the diameters thereof are of a similar order of magnitude. Another bore, starting from the upper side 4, creates an outlet opening on the surface opposite the side surface 5 in the x-direction. Thus, the through-bores 8 intersect in the rod-like protrusions 3 such that a 180-rotated V-shape of the bore channel in the cross-section through the xz-plane through a through-bore 8 results.

The bores 7, 8 form undercuts, in which a sliding lining is anchored in a form-fitting manner by infiltration in a later method step.

Figure 10:
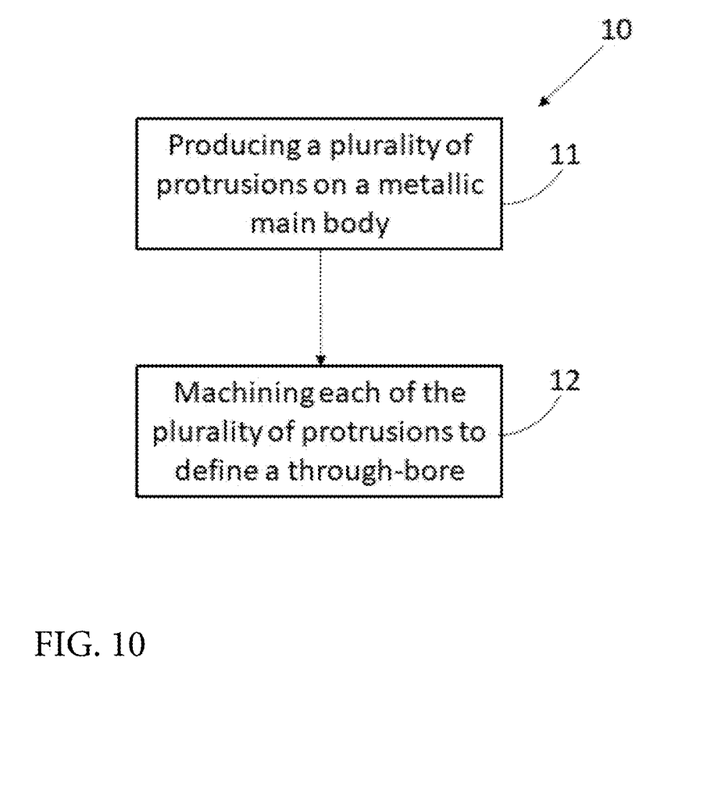
FIG. 10 shows a flow diagram of a method of producing a bearing body.

Referring now to FIG. 10, an exemplary embodiment a method 10 for producing a bearing body 1 includes the step 11 of producing a plurality of protrusions 3 on the metallic main body 2 of the bearing body 1. In some implementations, the plurality of protrusions 3 are produced by metal removing machining of the main body 2 by introducing intersecting grooves 6 in the surface of the main body 2. The method 10 may further include the step 12 of machining each of the plurality of protrusions 3 to define a through-bore 8. The through-bore 8 may extend transversely through the protrusion 3. In various embodiments, machining each of the plurality of protrusions 3 to define the through-bore 8 provides a form-fitting contour on each of the protrusions 3 for anchoring a sliding coating with the bearing body 1. In some embodiments, the through-bore 8 is produced in each of the plurality of protrusions 3 by laser machining. For example, each protrusion 3 may be laser machined, such that laser radiation is directed at different angles onto each protrusion 3 sequentially, such that the through-bore 8 extends through each protrusion 3 in a non-straight manner. In various implementations, each protrusion 3 includes a plurality of through-bores 8 passing through each protrusion 3. In such implementations, the plurality of through-bores 8 may be generated by laser radiation being directed exclusively at the upper side 4 of each of the plurality of protrusions 3.

LIST OF REFERENCE SYMBOLS

1 Bearing body
2 Main body
3 Rod-like protrusion, journal
4 Upper side
5 Side surface
6 Groove
7 Blind hole
8 Through-bore
9 Groove base
10 Method
11 Step
12 Step
α Angle
BR Machining direction
LR Longitudinal direction
QR Transverse direction
SP Intersection

The invention claimed is:

1. A method for producing a bearing body, comprising the steps of:
producing, on a surface of a metallic main body, a plurality of protrusions extending outward from the surface of the main body, each of the plurality of protrusions extending in a longitudinal direction from the main body to a surface of the protrusion that is distal from the main body; and
subsequently, machining each of the plurality of protrusions to define a through-bore that extends transversely through the protrusion relative to the longitudinal direction of the protrusion, such that each protrusion includes a contour for anchoring a sliding coating.

2. The method of claim 1, wherein the plurality of protrusions are produced by metal removal machining of the main body by introducing intersecting grooves in the surface of the main body.

3. The method of claim 1, wherein the through-bore is produced in each of the plurality of protrusions by laser machining.

4. The method of claim 3, wherein each protrusion is machined by laser, and wherein laser radiation is directed at different angles onto each protrusion sequentially, such that the through-bore extends through each protrusion in a non-straight manner.

5. The method of claim 4, wherein each protrusion includes a plurality of through-bores passing through each protrusion, and wherein the through-bores are generated by laser radiation being directed exclusively at an upper side of each protrusion.

6. A metallic bearing body for a sliding bearing, comprising:
- a plurality of protrusions located on the surface of a main body of the bearing body and formed in one piece from the main body of the bearing body, wherein the plurality of protrusions each have at least one through-bore running therethrough in a direction that is not parallel to a longitudinal direction of the protrusion.

7. The bearing body of claim 6, wherein each protrusion includes a blind hole running in the longitudinal direction of the protrusion, into which the at least one through-bore opens.

8. The bearing body of claim 7, wherein the at least one through-bore has a kinked shape, and wherein a bend is located in the blind hole and the at least one through-bore runs out at both of the ends thereof obliquely to the longitudinal direction of the protrusion.

9. The bearing body of claim 8, wherein the at least one through-bore comprises a plurality of through-bores that intersect in the blind hole.

10. The bearing body of claim 6, wherein each of the protrusions has a geometrically defined shape with a polygonal cross-section.

11. A metallic bearing body for a sliding bearing, comprising:
- a main body; and
- a plurality of protrusions extending outward from the main body, each of the plurality of protrusions extending in a longitudinal direction from the main body to an upper surface that is distal from the main body and having at least one through-bore that extends through the protrusion transversely relative to the longitudinal direction.

12. The bearing body of claim 11, wherein the through-bore that extends through the protrusion is angled relative to a surface of the main body from which the protrusion extends.

13. The bearing body of claim 11, wherein each of the plurality of protrusions includes a blind hole that extends through the upper surface and extends in the longitudinal direction.

14. The bearing body of claim 13, wherein the through-bore of each of the plurality of protrusions is in fluid communication with the blind hole of each of the plurality of protrusions.

15. The bearing body of claim 14, wherein each of the plurality of protrusions includes a plurality of through-bores that intersect the blind hole.

* * * * *